United States Patent [19]

Edison et al.

[11] Patent Number: 5,419,286
[45] Date of Patent: May 30, 1995

[54] SYSTEM FOR LOWERING EMISSIONS OF NITROGEN OXIDES

[75] Inventors: James Edison, Ventura; Douglas L. Evans, Oxnard; Robert W. Sanders, Ojai, all of Calif.

[73] Assignee: Conoco Inc., Ponca City, Okla.

[21] Appl. No.: 85,429

[22] Filed: Jun. 29, 1993

[51] Int. Cl.$^6$ .............................. F02B 75/12; F23J 7/00
[52] U.S. Cl. ........................................ 123/1 A; 431/4; 60/209
[58] Field of Search ............... 123/3, 1 A; 431/4; 60/209, 220

[56] References Cited

U.S. PATENT DOCUMENTS

| | | | |
|---|---|---|---|
| 3,834,359 | 9/1974 | Ando | 123/1 A |
| 3,900,554 | 8/1975 | Lyon | 123/1 A |
| 3,929,118 | 12/1975 | Leona | 123/1 A |
| 4,030,455 | 6/1977 | Van Eeck | 123/1 A |
| 4,223,642 | 9/1980 | Okubo | 123/1 A |
| 4,416,224 | 11/1983 | Hobby . | |
| 4,478,177 | 10/1984 | Vaidespino . | |
| 4,480,595 | 11/1984 | Hobby et al. . | |
| 4,507,269 | 3/1985 | Dean et al. . | |
| 4,559,007 | 12/1985 | Hashimoto et al. | 431/4 |
| 4,636,370 | 1/1987 | Dean et al. . | |
| 4,682,468 | 7/1987 | Dean et al. . | |
| 4,693,874 | 9/1987 | Hurst . | |
| 4,750,453 | 6/1988 | Vaidespino . | |
| 4,954,323 | 9/1990 | Sockell . | |
| 5,118,282 | 6/1992 | Reynolds et al. | 431/4 |
| 5,132,103 | 7/1992 | Schoubye . | |

OTHER PUBLICATIONS

Abstracts Obtained Through a Computer Generated Literature Search.
Operating-Maintenance-Parts Manual, Kleenaire Process System, MOdel No. KSVG 276 H for Clark HRA-6 (no date).

*Primary Examiner*—Willis R. Wolfe
*Assistant Examiner*—Erick Solis
*Attorney, Agent, or Firm*—William D. Hall

[57] ABSTRACT

The present invention provides an improved emissions reduction system for lowering the emissions of $NO_x$ generated by the combustion of hydrocarbons. The present invention further provides a method for lowering the emissions of $NO_x$ generated by the combustion of hydrocarbons.

19 Claims, 1 Drawing Sheet

A System For Reducing Oxides Of Nitrogen

A System For Reducing Oxides Of Nitrogen

SYSTEM FOR LOWERING EMISSIONS OF NITROGEN OXIDES

BACKGROUND AND SUMMARY OF THE INVENTION

1. SUMMARY OF THE INVENTION

The present invention provides an improved system for lowering the emissions of nitrogen oxides generated by the combustion of hydrocarbons. More specifically, the present invention provides a system wherein anhydrous ammonia is present during the combustion of the hydrocarbons thereby lowering the emissions of nitrogen oxides. The present invention additionally provides a method for lowering emissions of nitrogen oxides generated by the combustion of hydrocarbons.

2. BACKGROUND OF THE INVENTION

Oxides of nitrogen (nitrogen oxides, $NO_x$) are one of five primary pollutants generated by the combustion of hydrocarbons (the others are oxides of sulfur, carbon monoxide, hydrocarbons and particulates). While there are several oxides of nitrogen, nitric oxide (NO) and nitrogen dioxide ($NO_2$) are the principal air pollutants. It is interesting to note that the hydrocarbons provide neither the nitrogen nor the oxygen of the $NO_x$. Rather, the nitrogen and oxygen present in the air, which supports the combustion of the hydrocarbons, react due to the high temperatures of combustion to form NO. The NO then reacts immediately with $O_2$ to produce $NO_2$.

In areas such as Los Angeles, Buenos Aires and Mexico City, the accumulation of $NO_2$ results in the formation of photochemical smog, which is a product of the interaction of $NO_2$, $O_2$, hydrocarbons and ultra-violet light from the sun. Beyond the undesirable haze which results from this smog, the citizens of these regions may experience breathing difficulties, watery eyes and nasal irritations. In general, the tolerance level for $NO_2$ in air is set at 3 ppm.

While the majority of NO produced by land based engines reacts with oxygen in the air to produce $NO_2$, the NO produced by aircraft while in flight may have a detrimental effect on the ozone layer. This is shown by the following reactions:

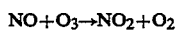

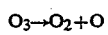

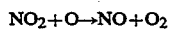

These reactions yield a net reaction of $2O_3 \rightarrow 3O_2$, which demonstrates the possible depletion of the ozone layer.

Previous attempts have been made to lower the emissions of $NO_x$. One method utilized in automobiles is the exhaust gas recirculation system. This method returns a portion of the exhaust gas to the cylinders lowering the emissions of $NO_x$ by reducing the flame temperature in the cylinder. However, this method also reduces the efficiency of the engine. Another method for lowering emissions of $NO_x$ provides for the injection of anhydrous ammonia into the exhaust system of an engine. The ammonia is injected immediately upstream of the exhaust system's catalytic converter and reacts with the $NO_x$ thereby lowering emissions of $NO_x$. The catalytic converter increases the rate of this reaction.

Although progress has been made in lowering the emissions of all pollutants, the additional lowering of all $NO_x$ emissions is desirable. Therefore, one object of the present invention is to provide an improved emissions system for lowering the emissions of all $NO_x$ generated by the combustion of hydrocarbons.

BRIEF DESCRIPTION OF THE INVENTION

The present invention provides an improved emissions reduction system for lowering emissions of $NO_x$ generated by the combustion of hydrocarbons within engines and burners. This system comprises a combustion region, an air intake system to supply air to the combustion region, a means for supplying hydrocarbons to the combustion chamber, a means for supplying anhydrous ammonia to the combustion region prior to combustion of the hydrocarbons, and an exhaust system for removing the combustion by-products from the combustion region. Additionally, the exhaust system contains a catalytic converter as a means for enhancing the reaction between the anhydrous ammonia and the $NO_x$.

The present invention further provides a method for lowering $NO_x$ emissions generated by the combustion of hydrocarbons. The method comprises the steps of passing air, anhydrous ammonia and hydrocarbons separately or as a mixture of two or three components into a combustion region. The hydrocarbons are combusted in the presence of the air and ammonia and the by-products are passed out of the combustion region into an exhaust system. The by-products then pass into a catalytic converter contained within the exhaust system. We believe that the catalytic converter enhances a reaction between the ammonia and the $NO_x$ leading to lower emissions of $NO_x$.

Finally, the present invention provides an internal combustion engine which emits a lower concentration of $NO_x$. The engine has an air intake system leading to a combustion chamber and an exhaust system for removing combustion by-products from the combustion chamber. The exhaust system includes a catalytic converter. Additionally, a means for introducing anhydrous ammonia into the air intake system has been provided.

DETAILED DESCRIPTION OF THE INVENTION

Figure 1:
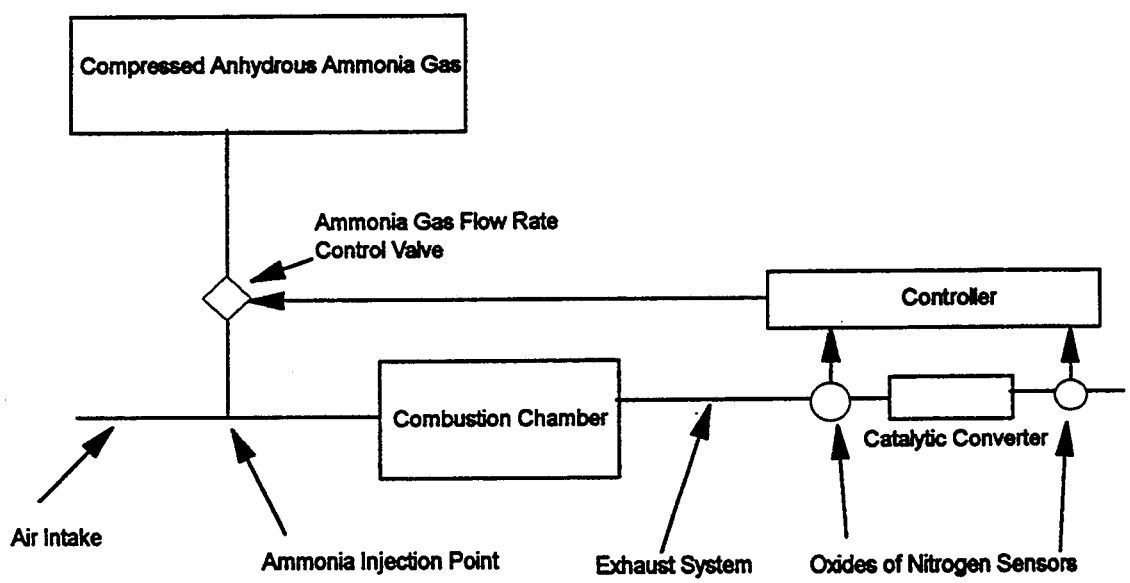
FIG. 1 shows a system for reducing oxides of nitrogen according to the invention.

The present invention may be applied to any apparatus which burns hydrocarbons as a means for producing energy. We believe the present invention takes advantage of a reaction between anhydrous ammonia and $NO_x$ as a means for lowering $NO_x$ emissions. In general, the products of this reaction are believed to be $N_2$ and water. As noted above, previous attempts to lower emissions of $NO_x$ have focused on the addition of anhydrous ammonia, after the combustion of the hydrocarbons, to the exhaust system upstream of the catalytic converter. This method provided a means for lowering the concentration of $NO_x$ leaving the catalytic converter by approximately 80% when compared to the concentration entering the catalytic converter. As environmental regulations become increasingly stringent, a need exists to further lower the emissions of $NO_x$.

Therefore, the present invention provides an emissions system for lowering the emissions of $NO_x$ by at least 90% when compared to the concentration of $NO_x$ generated by the combustion reaction. The present invention achieves this dramatic improvement in the lowering of $NO_x$ emissions by passing the anhydrous ammonia into the combustion region of an engine or other apparatus prior to combustion of the hydrocarbons. Although the invention will be described in relation to an internal combustion engine, one skilled in the art will realize that the invention may be applied to any apparatus which uses hydrocarbons to generate energy.

A. THE EMISSIONS SYSTEM

The components of an internal combustion engine are well known and will not be described in detail beyond that necessary for a full understanding of the present invention. The internal combustion engine of the present invention may be a two- or four-stroke engine and has at least one cylinder which forms a combustion region. The engine has an air intake system which supplies air to the combustion region to support the combustion of the hydrocarbons. The hydrocarbons may be supplied by any conventional means to the combustion region including fuel injection or carburetion. An exhaust system for removing combustion by-products from the combustion region is also part of the engine and further contains a catalytic converter. The improvement of the present invention being provided by a means for introducing anhydrous ammonia into the combustion region prior to combustion of the hydrocarbons.

The means for providing anhydrous ammonia to the combustion region may be located in the air intake system such that the air and ammonia enter the combustion region as a mixture. Alternatively, the means for providing the ammonia to the combustion region may be located adjacent to the combustion region in much the same manner as a fuel injector. The means for providing anhydrous ammonia to the combustion region may be a valve, an injector nozzle, or any other apparatus suitable for passing a gas or liquid into the air stream or the combustion region. If the ammonia is in a gaseous form at the nozzle prior to passing into the air stream or combustion chamber, the ammonia will pass into the air stream or the combustion chamber at a pressure which may range from about 3 psi to about 75 psi above engine manifold pressure. Alternatively, the ammonia may be at a sufficient temperature and pressure in order to insure that the ammonia is in the liquid state just prior to entering the air stream or combustion chamber. Under these conditions, the ammonia will flash instantly to a gas upon exiting the nozzle.

The exhaust system of the present invention contains a catalytic converter which preferably uses vanadium as a catalyst. However, other catalysts may also operate in the present invention. According to the present invention, the catalytic converter enhances the rate of reaction between the ammonia and the $NO_x$ which ultimately results in at least a 90% lowering of $NO_x$ when compared to the concentration of $NO_x$ entering the catalytic converter.

B. A METHOD OF LOWERING $NO_x$ EMISSIONS

When applied to an internal combustion engine, the method of the present invention lowers the emissions of $NO_x$ produced by the engine. This method comprises the following steps:

A. passing air, anhydrous ammonia and hydrocarbons into the cylinder of the engine;
B. combusting the hydrocarbons in the presence of the air and anhydrous ammonia;
C. passing the combustion by-products out of said combustion region into an exhaust system; and
D. allowing the combustion by-products to enter and pass through a catalytic converter contained within the exhaust system to enhance the reaction of the anhydrous ammonia and the $NO_x$ which was generated by the combustion process.

The method of the present invention may be optimized by monitoring the concentration of $NO_x$ as it exits the catalytic converter and adjusting the flow of anhydrous ammonia to the cylinder in order to achieve the lowest possible emissions. Preferably, the catalytic converter will be at a temperature of about 675° F. to about 1500° F.

According to this method, the gaseous anhydrous ammonia may be injected directly into the cylinder, may be mixed with the incoming air and passed into the cylinder, or may be mixed with the air and the hydrocarbons prior to entering the cylinder. If the anhydrous ammonia is mixed with the air prior to entering the cylinder, the ammonia preferably enters the air stream at a pressure of about 3 psi to about 75 psi above engine manifold pressure. In this manner, the rapid expansion of the ammonia will cool the incoming air, and as a result, the engine will operate more efficiently. Preferably, the anhydrous ammonia will be at a temperature of about 20° F. to about 70° F. when it is mixed with the incoming air stream. If injected directly into the cylinder, the anhydrous ammonia will preferably enter the cylinder at a pressure of about 3 psi to about 75 psi and a temperature of about 20° F. to about 70° F. and the air will enter the cylinder at a pressure of about $-13$ psi to about 50 psi. In an alternative embodiment, the anhydrous ammonia may be in a liquid state just prior to injection into the air stream or the combustion chamber. In this instance the ammonia flashes to a gas upon exiting the injecting apparatus.

The mixtures of either anhydrous ammonia and air or anhydrous ammonia, air and hydrocarbons will preferably be at a pressure of about $-13$ psi to about 50 psi when entering the cylinder. Within the cylinder, the mixture is further compressed and combusted. The combustion by-products then enter the exhaust system and are passed to the catalytic converter. Although the reactions and mechanisms which provide the extraordinary lowering of $NO_x$ emission are not fully understood, it is believed that the presence of the anhydrous ammonia during the combustion process when the $NO_x$ is formed increases the efficiency of a reaction between the ammonia and the $NO_x$ by increasing the temperature of reaction, the contact time between the reactants and improving mixing between the reactants.

The present invention also contemplates the use of a supercharger or turbocharger in order to compress the air/fuel/ammonia mixture within the cylinder. In instances where either device is used, the mixtures of air and ammonia or air, ammonia and hydrocarbons will preferably enter the cylinder at a pressure below that at which the ammonia becomes a liquid. If the ammonia is injected directly into the cylinder, the incoming air will preferably be at a pressure of about 1 psi to about 50 psi. Under these conditions it is feasible that the pressure within the combustion chamber prior to combustion may be as high as 750 psi after the mixture has been compressed.

The following examples are provided to more concretely describe the present invention and not to limit the present invention.

EXAMPLE 1

A six cylinder, two-stroke internal combustion engine using natural gas fuel was operated to determine the emissions of $NO_x$. The engine consisted of an air intake duct feeding a scavenging pump. The scavenging pump raised the incoming air pressure to about 2–4 psi prior to the air entering the combustion chambers. The natural gas fuel was fed to the combustion chambers by fuel injectors where it was combined with the air. Combustion was initiated by a spark provided by a spark plug. Combustion by-products exited the combustion chamber and entered an exhaust system. The exhaust system consisted of a catalytic converter, suitable for lowering $NO_x$ emissions, connected to the engine by an exhaust manifold and an exhaust pipe. Positioned within the exhaust pipe was a nozzle which provided a stream of anhydrous ammonia at a pressure of 5–15 psi and a temperature of 30°–50° F. The anhydrous ammonia was combined with the combustion by-products prior to entering the catalytic converter. The reaction of the anhydrous ammonia with nitrogen oxide in the exhaust stream was enhanced by the catalytic converter resulting in an 87% decrease in $NO_x$ when compared to the concentration of $NO_x$ entering the catalytic converter, as shown by the table below.

EXAMPLE 2

The engine of Example 1 was modified in order to further enhance the removal of $NO_x$ by the reaction with the anhydrous ammonia. In the modified engine, the injection point of anhydrous ammonia was transferred from the exhaust pipe to the air intake duct. In this position, anhydrous ammonia was injected into the incoming air at a pressure of 2–15 psi and a temperature of 30°–50° F. prior to combustion of the air/fuel mixture. Thus, ammonia was present during the combustion reaction and exited the combustion chamber along with the combustion by-products. The combustion by-products/anhydrous ammonia mixture exited the combustion chamber, passed through the exhaust pipe and entered the catalytic converter. As shown by the chart below, the concentration of $NO_x$ entering the catalytic converter was equal to that of the unmodified system. However, the concentration of $NO_x$ leaving the catalytic converter was significantly reduced when compared to that of the previous example. Thus, as shown by the table below, the present invention further lowered the emissions of $NO_x$ emitted from the catalytic converter by 81% when compared to the previous method.

|   | TEMP | INLET ppm | OUTLET ppm | % REDUCTION |
|---|---|---|---|---|
| Example 1 | | | | |
| $NO_x$ | 68° | 1200 | 160 | 87% |
| $NH_3$ | 68° | 0 | 180 | |
| Example 2 | | | | |
| $NO_x$ | 68° | 1200 | 30 | 98% |
| $NH_3$ | 68° | 150 | 0 | |

(NOTE:
In example 1, the inlet ppm measurement was taken upstream of the ammonia injection nozzle.)

Other embodiments of the present invention will be apparent to those skilled in the art from a consideration of this specification or practice of the invention disclosed herein. It is intended that the specification be considered as only exemplary, with the true scope and spirit of the invention being indicated by the following claims.

We claim:

1. An emissions reduction system for lowering emissions of nitrogen oxides generated by the combustion of hydrocarbons comprising:
    a combustion region for combusting said hydrocarbons;
    an air intake system for supplying air to said combustion region;
    means for supplying anhydrous ammonia to said combustion region prior to combustion of said hydrocarbons;
    an exhaust system for removing combustion by-products from said combustion region;
    a catalytic converter contained within said exhaust system;
    means for monitoring the concentration of nitrogen oxides entering said catalytic converter;
    means for monitoring the concentration of nitrogen oxides exiting from said catalytic converter; and
    means for controlling the rate of addition of said anhydrous ammonia to said combustion region based on the concentration of nitrogen oxides emitted from said exhaust system.

2. The emissions reduction system of claim 1, wherein said means for supplying anhydrous ammonia to said combustion region is positioned within said air intake system.

3. The emissions reduction system of claim 1, wherein said means for supplying anhydrous ammonia to said combustion region is positioned adjacent to said combustion region.

4. The emissions reduction system of claim 1, wherein said means for supplying anhydrous ammonia injects the ammonia at a pressure of about 3 psi to 75 psi above the air pressure within said air intake system.

5. The emissions reduction system of claim 1, wherein said combustion region is a cylinder of an internal combustion engine.

6. The emissions reduction system of claim 1, wherein said combustion region is within a turbine engine.

7. The emissions reduction system of claim 1, wherein said combustion region is a burner.

8. A method for lowering nitrogen oxides emissions generated by the combustion of hydrocarbons in a combustion region comprising:
    passing air, anhydrous ammonia and hydrocarbons into said combustion region;
    combusting said hydrocarbons in the presence of said air and ammonia within said combustion region generating energy and combustion by-products including nitrogen oxides;
    passing said combustion by-products out of said combustion region into an exhaust system;
    passing said combustion by-products into a catalytic converter contained within said exhaust system whereby the emissions of nitrogen oxides passing out of said exhaust system are decreased;
    monitoring the concentration of nitrogen oxides entering said catalytic converter;
    monitoring the concentration of nitrogen oxides exiting from said catalytic converter; and
    controlling the rate of addition of said anhydrous ammonia to said combustion region based on the concentration of nitrogen oxides emitted from said exhaust system in order to limit nitrogen oxides emissions from said catalytic converter to no more than five percent of the concentration entering said catalytic converter.

9. The method of claim 8, wherein said anhydrous ammonia is mixed with the air prior to entering said combustion region.

10. The method of claim 9, wherein said anhydrous ammonia is at a pressure of about 3 psi to about 75 psi when mixed with the air.

11. The method of claim 9, wherein said anhydrous ammonia is at a temperature of about 20° F. to about 70° F. when mixed with the air.

12. The method of claim 9, wherein said mixture of anhydrous ammonia and air enters said combustion region at a pressure of about $-13$ psi to about 50 psi.

13. The method of claim 9, wherein said hydrocarbons, said air and said anhydrous ammonia within said combustion region are compressed to a pressure of about 4 psi to about 750 psi.

14. The method of claim 8, wherein said anhydrous ammonia is injected directly into said combustion region.

15. The method of claim 14, wherein said air enters said combustion region at a pressure of about $-13$ psi to about 50 psi.

16. The method of claim 8, wherein said catalytic converter is at a temperature of about 675° F. to about 1500° F.

17. In an internal combustion engine having an air intake system to a combustion chamber of the engine and an exhaust system for removing combustion by-products from the combustion chamber which includes a catalytic converter for lowering nitrogen oxides emissions in the combustion by-products, the improvement which comprises:

means for introducing anhydrous ammonia into the air intake system whereby nitrogen oxides emissions are further lowered beyond that which would result without such introduction of ammonia;

means for monitoring the concentration of nitrogen oxides entering said catalytic converter;

means for monitoring the concentration of nitrogen oxides exiting from said catalytic converter; and means for controlling the rate of addition of said anhydrous ammonia to said combustion region based on the concentration of nitrogen oxides emitted from said exhaust system.

18. The emissions reduction system of claim 17, wherein said means for supplying anhydrous ammonia to said combustion region is positioned adjacent to said combustion region.

19. The emissions reduction system of claim 17, wherein said means for supplying anhydrous ammonia injects the ammonia at a pressure of about 3 psi to 75 psi above the air pressure within said air intake system.

* * * * *